Aug. 23, 1938.   S. D. BURFORD   2,128,118
COMBINED HOLDER AND DRAINER DEVICE
Filed July 23, 1937

Inventor
Samuel D. Burford
By Kimmel & Crowell
Attorneys

Patented Aug. 23, 1938

2,128,118

UNITED STATES PATENT OFFICE 2,128,118

COMBINED HOLDER AND DRAINER DEVICE

Samuel D. Burford, Wellsville, Ohio

Application July 23, 1937, Serial No. 155,350

3 Claims. (Cl. 45—28)

This invention relates to a combined holder and drainer device designed primarily for holding and for the draining of a cake of soap, but it is to be understood that the device, in accordance with this invention is for use in any connection for which it may be found applicable.

The invention has for its object to provide, in a manner as hereinafter set forth, a flat body of impervious resilient material having means for retaining thereon, in superposed relation with respect to its upper face a cake of soap in position for drainage, as well as having inherent means to enable for detachably securing it stationary upon a supporting surface.

A further object of the invention is to provide, in a manner as hereinafter set forth, a device for the purpose referred to including an impervious flat body having one face provided with means for releasably securing it, by suction, stationary to a supporting surface and its other face formed throughout with spaced protuberances, certain of which support the cake of soap for drainage and the others of which function to arrest the sliding of the cake from off of the device.

A further object of the invention is to provide, in a manner as hereinafter set forth, a device for the purpose set forth formed throughout one of its faces, with spaced protuberances, certain of which are so formed and arranged relatively to each other to so support a cake of soap in draining position to enable it to drain dry and with no chance for the soap to become soggy or saturated with water thereby preventing waste of soap; and the others of the protuberances being so formed and arranged so as to prevent the cake of soap from sliding off of the device.

A further object of the invention is to provide, in a manner as hereinafter referred to, a device for the purpose set forth for use in homes, hotels, restaurants, barber shops, dentists' offices, beauty parlors, rooming houses, lavatories, etc., and which is so constructed, that, when used it will not in any manner impair the appearance of its surroundings.

Further objects of the invention are to provide, in a manner as hereinafter set forth, a device for the purpose referred to which is simple in its construction, strong, durable, compact, impervious, pleasing in appearance, capable of being expeditiously secured in stationary position to a supporting surface, thoroughly efficient in its use, and comparatively inexpensive to manufacture.

To the above ends essentially and to others which may hereinafter appear, the invention consists of the novel construction, combination and arrangement of parts as will be more specifically referred to and illustrated in the accompanying drawing wherein is shown an embodiment of the invention, but it is to be understood that changes, variations and modifications may be resorted to which fall within the scope of the invention as claimed.

Figure 1:
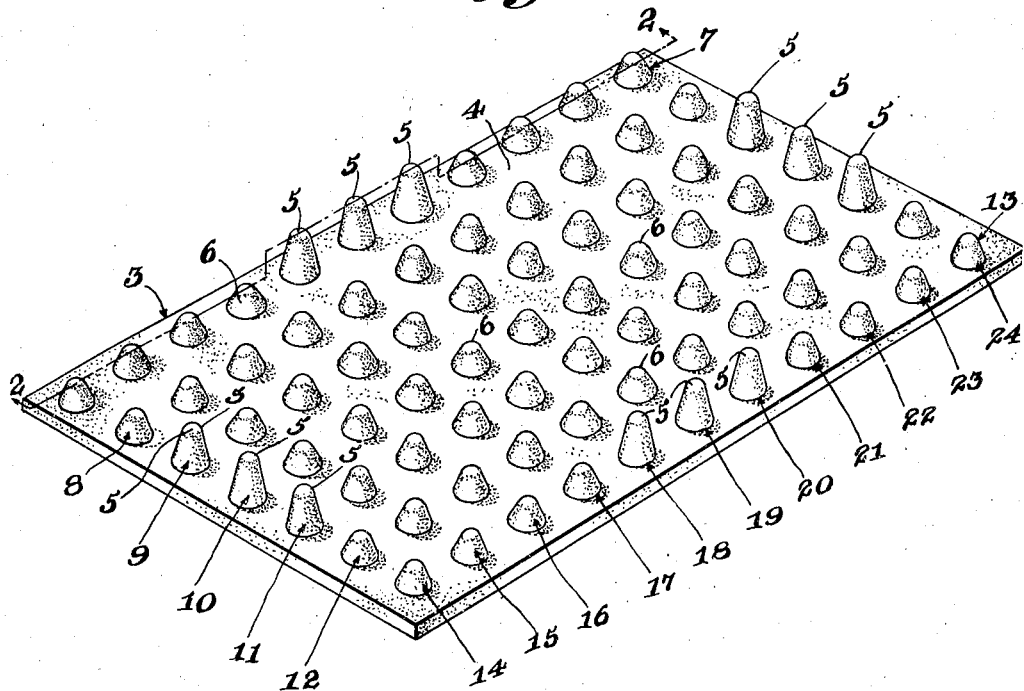
Figure 1 is a perspective view of the device.
Figure 2:
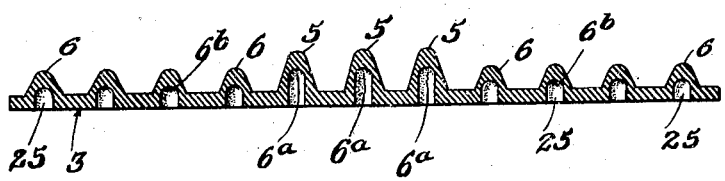
Figure 2 is a section on line 2—2 Figure 1.

The device may be of any suitable contour, preferably rectangular and is so shown. The device is formed of a molded one-piece body of any suitable non-metallic, impervious resilient material. Preferably the device will be constructed of soft rubber.

The device, as shown includes a rectangular body part 3, termed a carrier, of the desired thickness, width and length having its outer face 4 formed throughout with spaced aligned protuberances or nipples of conoidal contour. The protuberances are so arranged with respect to each other to provide parallel spaced rows of spaced protuberances disposed lengthwise of said face 4 and parallel spaced rows of spaced protuberances transversely of said face 4. Certain of the protuberances are of greater height than the others. The protuberances of greater height are designated 5 and the smaller protuberances as 6. The protuberances 5, 6 are formed with lengthwise pockets 6$^a$ 6$^b$ respectively, which are closed at their tops and open at their bottoms. The pockets 6$^a$ are of greater height than the pockets 6$^b$. The protuberances 5 are of uniform height. The protuberances 6 are of uniform height.

The lengthwise rows of protuberances are indicated at 7, 8, 9, 10, 11, 12 and 13 and the transverse rows at 14, 15, 16, 17, 18, 19, 20, 21, 22, 23 and 24. The rows 7 and 13 are the outer lengthwise rows, and the rows 14 and 24 the outer transverse rows. The rows 8, 12, 15, 16, 17, 21, 22 and 23 consist solely of the smaller protuberances 6. The row 7 and the row 13 consists of a series of protuberances 5 and two series of protuberances 6 and with the series of protuberances 5 arranged between the two series of protuberances 6. The row 14 and the row 24 consists of a series of protuberances 5 and two pairs of protuberances 6 and with the said series arranged between the said pairs.

The rows 7 and 13 are arranged in proximity to the side edges and the rows 14, 24 positioned in proximity to the end edges of body part 3. Each of the rows 9, 10, 11, 18, 19, 20 consists of a pair of protuberances 5 and a series of protuberances 6 and with the protuberances 5 arranged at the ends of the row. The protuberances 6 constitute spaced means for supporting the cake of soap in drainage position in superposed relation with respect to body part 3. The protuberances 5 are disposed centrally of the sides and ends of body part 3, extend above the protuberances 6 and constitute means to prevent the sliding off of the cake of soap when mounted in drainage position.

The body part 3 is formed with transverse and lengthwise rows of openings 25 which register with the open lower ends of the pockets 6ª, 6ᵇ. The openings 25 coact with said pockets to form suction chambers for coaction with the supporting surface on which the device is placed for the purpose of detachably securing the latter stationary on such surface.

What I claim is:

1. A drainer device comprising, an impervious one piece resilient body formed of a flat carrier provided throughout with spaced intersecting parallel, longitudinal and transverse rows of spaced openings, the said openings extending from the inner to the outer face of the carrier, spaced intersecting parallel longitudinal and transverse rows of upstanding conoidal-shaped spaced projections integral at their inner ends with the outer face of the carrier and having closed outer ends, each of said protuberances being formed in its inner portion with an inwardly opening pocket, each of said protuberances, at its inner end surrounding the outer end of an opening and having its pocket forming an outward continuation of and coacting with such opening to provide a suction chamber opening at the bottom of the carrier, the central protuberances of each outer longitudinal row of protuberances being of greater height than the other protuberance of such row and the protuberances of the inner longitudinal rows of protuberances, and the central protuberances of each outer transverse row of protuberances being of greater height than the other protuberance of such row and the protuberances of the inner transverse rows of protuberances.

2. A drainer device comprising, an impervious one piece resilient body formed of a flat carrier provided throughout with spaced intersecting parallel, longitudinal and transverse rows of spaced openings, the said openings extending from the inner to the outer face of the carrier, spaced intersecting parallel longitudinal and transverse rows of upstanding conoidal-shaped spaced projections integral at their inner ends with the outer face of the carrier and having closed outer ends, each of said protuberances being formed in its inner portion with an inwardly opening pocket, each of said protuberances, at its inner end surrounding the outer end of an opening and having its pocket forming an outward continuation of and coacting with such opening to provide a suction chamber opening at the bottom of the carrier, the central protuberances of each outer longitudinal row of protuberances being of greater height than the other protuberance of such row and the protuberances of the inner longitudinal rows of protuberances, and the central protuberances of each outer transverse row of protuberances being of greater height than the other protuberance of such row and the protuberances of the inner transverse rows of protuberances, the central protuberances of each outer longitudinal row and each outer transverse row being of uniform height and each having its pocket of greater depth than the pockets in the other protuberances of such rows and the pockets in the protuberances of the inner longitudinal and transverse rows of protuberances.

3. A drainer device comprising, an impervious one piece resilient body formed of a flat carrier provided throughout with spaced intersecting parallel, longitudinal and transverse rows of spaced openings, the said openings extending from the inner to the outer face of the carrier, spaced intersecting parallel longitudinal and transverse rows of upstanding conoidal-shaped spaced projections integral at their inner ends with the outer face of the carrier and having closed outer ends, each of said protuberances being formed in its inner portion with an inwardly opening pocket, each of said protuberances, at its inner end surrounding the outer end of an opening and having its pocket forming an outward continuation of and coacting with such opening to provide a suction chamber opening at the bottom of the carrier, the central protuberances of each outer longitudinal row of protuberances being of greater height than the other protuberance of such row and the protuberances of the inner longitudinal rows of protuberances, and the central protuberances of each outer transverse row of protuberances being of greater height than the other protuberance of such row and the protuberances of the inner transverse rows of protuberances, said carrier being of uniform thickness throughout and of rectangular contour, the outer longitudinal rows of openings and protuberances being spaced from the longitudinal edges of the carrier, the outer transverse rows of openings and protuberances being spaced from the transverse edges of the carrier.

SAMUEL D. BURFORD.